May 28, 1935.    D. J. BONTRAGER    2,002,520
SCOOTER
Filed July 17, 1931
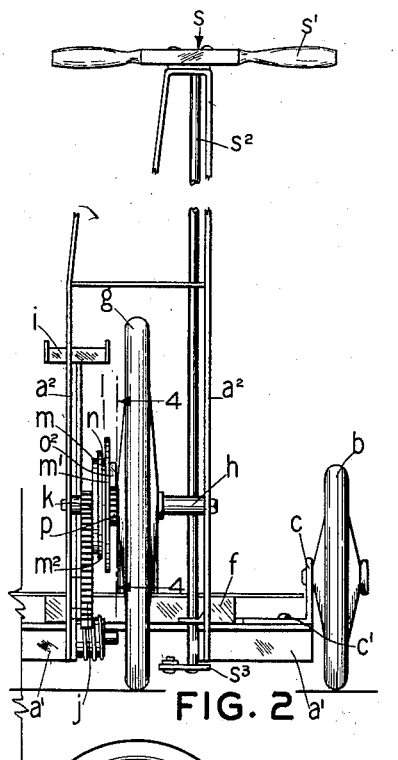
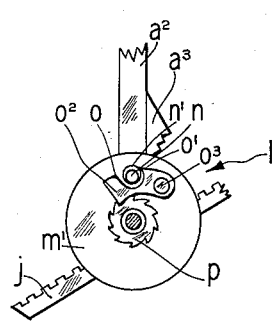
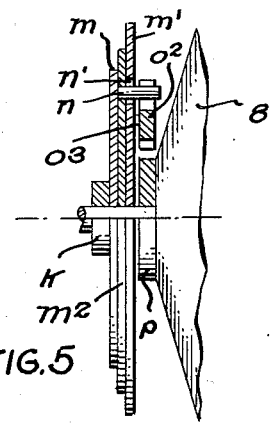
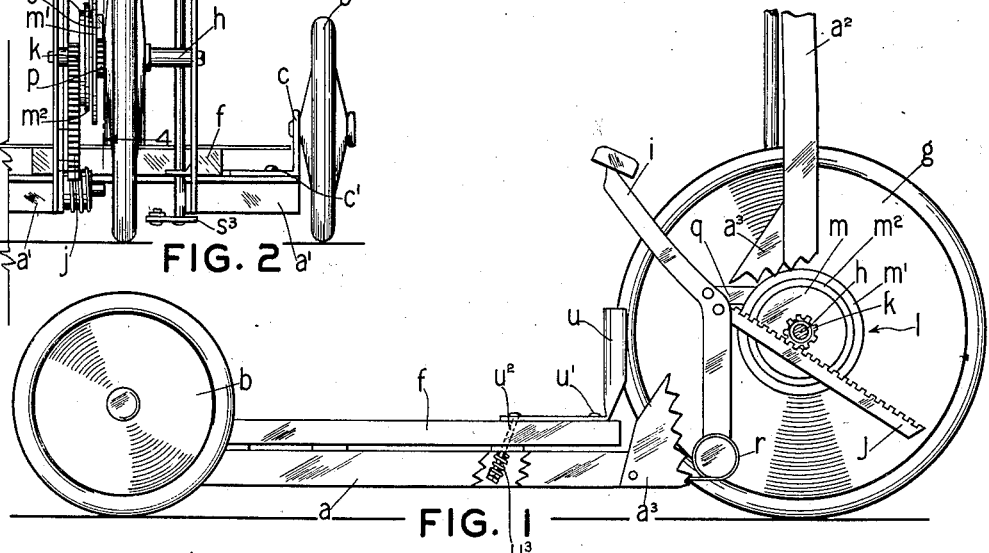
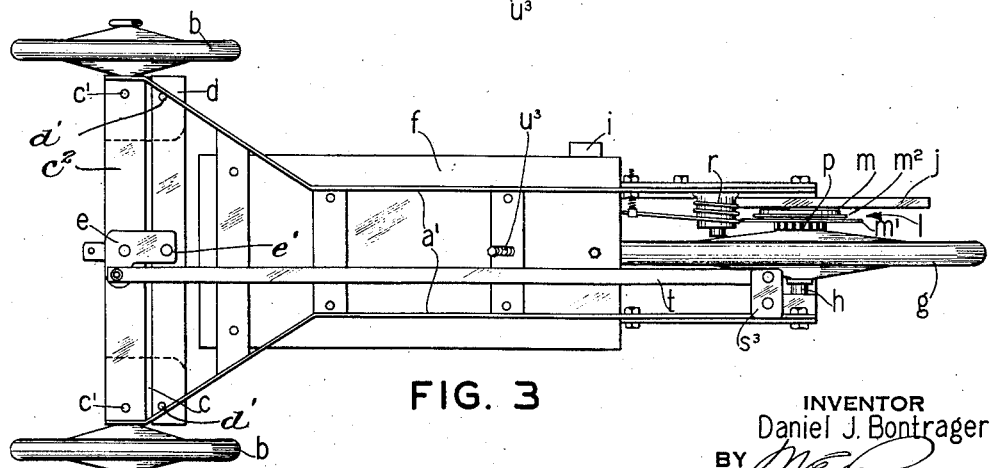
INVENTOR
Daniel J. Bontrager
BY
ATTORNEY Patented May 28, 1935

2,002,520

UNITED STATES PATENT OFFICE 2,002,520

SCOOTER

Daniel J. Bontrager, Portland, Oreg.

Application July 17, 1931, Serial No. 551,338

8 Claims. (Cl. 208—37)

My invention relates to small wheeled devices and particularly to that type of self-propelling device commonly termed a "scooter". Such device is usually made in such sizes as to be conveniently operated by children and includes a narrow elongated platform supported at its ends by free-running wheels. A pair of wheels is preferably provided at the rear edge of the platform to provide lateral stability and a forward central steering wheel is provided at the other end of such elongated platform. Such device is commonly operated by supporting the weight upon one foot resting on the platform and by pushing the device with the other foot.

The primary object of my invention is to provide a device of this character with driving means carried by the device itself so as to eliminate the necessity of pushing such device along. Preferably such driving mechanism is operatively connected to one of the supporting wheels in such a manner that it readily and quickly engages such wheel during the propelling stroke and equally readily and quickly releases such wheel at the end of such propelling stroke. Thus all of such wheels are free to rotate and the device to coast at the end of such stroke. All of such wheels are provided with anti-friction bearings to increase the coasting ability of the device. To promote greater lateral stability, the front or forward wheel is mounted to rotate upon a fixed non-pivoted axis and steering is effected by the connected pair of rear wheels.

A further feature of my invention is the provision of an upright steering handle for such rearward pair of wheels, offset with respect to the center line of the platform to a degree substantially equal to an offset provided in the pedal constituting a part of the driving mechanism, except that such parts are offset oppositely with respect to the longitudinal center line of the platform. The handle or steering device is normally used to balance the operator of my improved vehicular toy as well as to steer it and the positioning of the parts in this manner serves automatically to counteract the tendency of the device to become out of lateral balance when the foot lever is operated.

Further details of construction and incidental objects of my invention are hereinafter described in connection with a description of the operation and with respect to the accompanying drawing, in which:

Fig. 1 is a side view of such device with portions of the frame shown broken away to disclose operating details of the driving mechanism;

Fig. 2 is an end elevation thereof facing the forward or driving wheel;

Fig. 3 is a plan view looking from the under side of such device at the operating mechanism located beneath the platform;

Fig. 4 is a sectional view taken substantially on the line 4—4 in Fig. 2 and illustrates details of a portion of the driving device; and Fig. 5 is an enlarged view of the clutch mechanism with portions shown broken away to disclose details of construction.

My improved device comprises a frame $a$ consisting of a series of longitudinal members $a'$, which diverge outwardly towards the rear and serves as supports for the rear wheels $b$.

Such wheels are not carried directly by the frame, but are carried by a pair of transverse members $c$, each pivotally mounted upon an end of the frame member $c^2$, which latter extend across the rear of the scooter. The connections are made upon pivot points $c'$ and said members $c$ swing upon identical arcs thereby causing the wheels $b$ to remain in parallelism. Pivotally connecting said members $c$ at pivot points $d'$ is a rod $d$. Said rod in turn is pivotally connected to a toggle member $e$ by a pivot $e'$. Said toggle member $e$ is pivotally mounted on said frame member $c^2$ upon pivot point $c^3$ and thus angular movement of the toggle member $e$ upon its pivot point $c^3$ causes corresponding angular movement of the members $c$ and the wheels $b$. This constitutes the rear wheels $b$ as the steering and guiding wheels and, being connected together and moving upon identical arcs, causes them always to be arranged in parallelism with each other.

Extending upwardly from the members $a'$ is a vertical U-shaped member $a^2$, which is welded or otherwise secured to the members $a'$ and braces $a^3$, the latter also forming a part of the frame and serving to strengthen, support and connect the frame members $a'$ and $a^2$. A platform $f$ is carried by the frame and forwardly of such platform a single wheel $g$ is journaled between the portions of the vertical frame member $a^2$. Such wheel is carried by a non-pivotal axle $h$ and said wheel revolves freely upon the latter. Means are provided for rotating such forward wheel $g$, which means are adapted to become automatically disconnected when the driving mechanism is not functioning, so as to permit such forward wheel $g$ and the pair of rear wheels $b$ to rotate freely and to permit the devices to coast without drag exercised by the propelling mechanism.

A foot lever $i$ extends rearwardly from the wheel $g$ and overlies the forward edge of the platform $f$. Such foot lever carries an elongated rack $j$, which rack engages with a pinion $k$ also freely rotatable upon the axle $h$.

A clutch $l$ is operatively arranged between the pinion $k$ and the non-steering or driving wheel $g$. Said clutch includes a series of circular plates $m$—$m'$—$m^2$ arranged in vertically stacked relation upon the shaft $h$. The plate $m$ lying next to the pinion $k$ is welded or otherwise secured to said pinion, the central plate $m^2$ is merely a spacer, and the plate $m'$, which lies adjacent the wheel $g$ carries an overriding pawl $o^2$ which is adapted operatively to engage the circular ratchet $p$. Said ratchet $p$ is welded or otherwise secured to the wheel $g$. Inasmuch as the shaft $h$ is a dead axle, all of the parts are journaled upon and adapted to rotate freely thereon.

Secured to the plate $m$ and extending laterally thru enlarged apertures in the other two plates $m'$ and $m^2$ is a lateral pin $n$ which is operatively adapted to engage a notch formed in the pawl $o^2$. The sides of said notch are formed into cam surfaces $o$ and $o'$. The cam surface $o$ is inclined upwardly out of said notch, while the cam surface $o'$ is undercut slightly, as is shown in Fig. 4. The aperture $n'$ in the plate $m'$ is enlarged to such a degree that the pin $n$ can shift relatively in the notch so as to engage either of said two cam surfaces thereof. Said pawl $o^2$ is pivotally mounted upon the pin $o^3$ and has a relatively free action upon said pin $o^3$, so that when the whole assembly is rotated, as when the pawl engages the teeth of the ratchet $c$, it causes the pawl $o^2$ to tend to be thrown free, that is, out of engagement with said ratchet.

Engagement of said pawl with said ratchet is effected by a depression of the foot lever $i$, which causes the rack to rotate the pinion $k$ so that the rotatable parts shown in Fig. 4 will be given a clockwise movement. This will bring the cam face $o$ into engagement with the pin $n$ and will tend to force the pawl downwardly and to bring it into engagement with the teeth of the ratchet $p$.

As has been pointed out, the pawl tends to swing free, that is out of engagement with the ratchet at the end of a stroke, due to the centrifugal force generated and due to the free action of said pawl. The cam $o'$ being undercut also tends to lift the pawl $o^2$ out of engagement with the ratchet when the parts are relatively reversed by the retraction of the foot lever $i$, acted upon by its spring $r$.

As an auxiliary device for moving the dog out of operative engagement, a stop $q$ is arranged to engage with the dog when the foot lever $i$ is moved to its upper position by the spring $r$. Such stop engages the back of the dog and the parts are arranged so that the dog is held slightly out of engagement with the teeth.

Steering of such device is effected thru a handle $s$ mounted for rotation about a vertical axis extending thru the vertical frame member $a^2$. Such handle comprises a grip $s'$, a rod $s^2$ and a lever arm $s^3$, the latter being fixed to the lower end of the rod $s^2$ and in the plane of the frame elements $a'$. Pivotally connecting such lever arm $s^3$ and the toggle member $e$ is a longitudinal reciprocally-mounted rod $t$ and thus the angular movement of the rod $s^2$ of the handle is translated into relative angular movement of the toggle member $e$, and therewith corresponding movement of the rear wheels $b$.

As can be noted in Figs. 2 and 3, the center of the handle $s$ is arranged at one side of the wheel $g$ and the foot lever $i$ is arranged at the opposite side of such wheel and the offset from the plane of such wheel of said two parts is substantially identical except that such offset is in opposite directions. The purpose of arranging these parts in this manner, as has been set out heretofore, is that the downward pressure upon the pedal in operating the driving mechanism tends to unbalance the device. The weight of the operator is, in part, supported by the handle $s$ and the parts being thus offset the weight of the operator upon the handle tends to counterbalance the pressure of the foot acting off center and exerted upon the foot lever $i$.

Carried by the forward end of the platform $f$ is a brake shoe $u$ substantially semi-circular in cross-section and conformed generally to the contour of the tire on the wheel $g$. Such brake shoe is pivotally mounted upon a pin $u'$. A pin $u^2$ extends thru the platform and engages such shoe and a coil spring $u^3$ is mounted about such pin, engages the under surface of the platform and tends to hold the brake shoe out of engagement with the wheel $g$. Pressure exerted upon such shoe by the foot of the operator forces the shoe into engagement with the wheel. The compression of the spring $u^3$ tends to return the shoe to its original position as soon as the pressure is released.

I claim:

1. A toy of the character described including a frame, a platform carried by said frame, a wheeled support for said frame, said support including one non-steering wheel, a foot lever mounted adjacent said non-steering wheel, and a pawl-and-ratchet mechanism adapted to connect said foot lever with said wheel, the pawl of said mechanism being externally arranged with respect to the ratchet, said pawl being gravity engaged and being unrestrained, thus being adapted to be disengaged by centrifugal force.

2. A toy of the character described including a frame, a platform carried by said frame, a wheeled support for said frame, said support including one non-steering wheel, a foot lever mounted adjacent said non-steering wheel, a pawl-and-ratchet mechanism including a relatively rotatable member, said mechanism being adapted to connect said foot lever with said wheel, the pawl of said mechanism being externally arranged with respect to the ratchet and being carried by the rotatable member, and cam elements operable to engage and disengage said pawl with relation to the ratchet in opposite movements of said foot lever.

3. A toy of the character described including a frame, a platform carried by said frame, a wheeled support for said frame, said support including one non-steering wheel, a foot lever mounted adjacent said non-steering wheel, a pawl-and-ratchet mechanism including a relatively rotatable member, said mechanism being adapted to connect said foot lever with said wheel, the pawl of said mechanism being externally arranged with respect to the ratchet and being carried by the rotatable member, and cam elements operable to engage and disengage said pawl with relation to the ratchet in opposite movements of said foot lever, said pawl being gravity engaged and being unrestrained, thus being adapted to be disengaged by centrifugal force.

4. A toy of the character described including a frame, a platform carried by said frame, a wheeled support for said frame, said support including two upwardly extending braces, a forward non-steering wheel journaled between said braces, a foot lever mounted adjacent said non-steering wheel, said foot lever being pivotally mounted between said two upwardly extending braces and being operatively connected to said wheel by mechanism also located between said braces and normally disengaged from said wheel, and steering means including an upwardly extending handle pivotally mounted about a vertical axis extending between said braces, a steering wheel and connections operatively joining said steering wheel with the handle.

5. A toy of the character described including a frame, a platform carried by said frame, a wheeled support for said frame, said support including two upwardly extending braces, a forward non-steering wheel journaled between said braces, a foot lever mounted adjacent said non-steering wheel, said foot lever being pivotally mounted between said two upwardly extending braces and being operatively connected to said wheel by mechanism also located between said braces and normally disengaged from said wheel, and steering means including an upwardly extending handle pivotally mounted about a vertical axis extending between said braces, a steering wheel and connections operatively joining said steering wheel with the handle, the foot lever and the steering handle being offset laterally from the longitudinal center line of the platform and arranged at opposite sides of said center line to give said toy lateral stability in operation.

6. A toy of the character described including a frame, a platform carried by said frame, a wheeled support for said frame, said support including two upwardly extending braces, a forward non-steering wheel journaled between said braces, a foot lever mounted adjacent said non-steering wheel, said foot lever being pivotally mounted between said two upwardly extending braces and being operatively connected to said wheel by mechanism also located between said braces and normally disengaged from said wheel, and steering means including an upwardly extending handle pivotally mounted about a vertical axis extending between said braces, and a pair of rearwardly arranged wheels joined together and also mounted upon vertical axes, said steering means also including devices connecting said rearwardly arranged wheels with said steering handle.

7. A toy of the character described including a frame, a platform carried by said frame, a wheeled support for said frame, said support including two upwardly extending braces, a foot lever mounted adjacent said non-steering wheel, said foot lever being pivotally mounted between said two upwardly extending braces and being operatively connected to said wheel by mechanism also located between said braces and normally disengaged from said wheel, and steering means including an upwardly extending handle pivotally mounted about a vertical axis extending between said braces, the foot lever and the steering handle being offset laterally from the longitudinal center line of the platform and arranged at opposite sides of said center line to give said toy lateral stability in operation, and a pair of rearwardly arranged wheels joined together and also mounted upon vertical axes, said steering means also including devices connecting said rearwardly arranged wheels with said steering handle, said latter devices being arranged beneath said platform and extending between the elements comprising the frame of said toy.

8. A toy of the character described including a frame, a platform carried by said frame, a wheeled support for said frame, said support including two upwardly extending braces, a forward non-steering wheel journaled between said braces, a foot lever mounted adjacent said non-steering wheel, said foot lever being pivotally mounted between said two upwardly extending braces and being operatively connected to said wheel by mechanism also located between said braces and normally disengaged from said wheel, and steering means including an upwardly extending handle pivotally mounted about a vertical axis extending between said braces, the foot lever and the steering handle being offset laterally from the longitudinal center line of the platform and arranged at opposite sides of said center line to give said toy lateral stability in operation, and a pair of rearwardly arranged wheels joined together and also mounted upon vertical axes, said steering means also including devices connecting said rearwardly arranged wheels with said steering handle.

DANIEL J. BONTRAGER.